(12) United States Patent
Chen et al.

(10) Patent No.: US 7,289,430 B2
(45) Date of Patent: *Oct. 30, 2007

(54) EQUIPMENT MONITORING SYSTEM LINE SWAP FAST RECOVERY METHOD

(75) Inventors: Ming-Chuang Chen, Taipei (TW); Wen-Shuai Liu, Hsintien (TW)

(73) Assignee: Moxa Technologies Co., Ltd., Taipei Hsien (TW)

( * ) Notice: Subject to any disclaimer, the term of this patent is extended or adjusted under 35 U.S.C. 154(b) by 1044 days.

This patent is subject to a terminal disclaimer.

(21) Appl. No.: 10/268,535

(22) Filed: Oct. 9, 2002

(65) Prior Publication Data

US 2004/0017782 A1    Jan. 29, 2004

(30) Foreign Application Priority Data

Jul. 25, 2002    (TW) ............................... 91116632 A

(51) Int. Cl.
*G01R 31/08* (2006.01)
(52) U.S. Cl. .................. 370/217; 370/248; 370/245
(58) Field of Classification Search ................ 370/217, 370/238.1, 241, 252, 254, 378; 709/224; 340/853.2
See application file for complete search history.

(56) References Cited

U.S. PATENT DOCUMENTS

| 6,421,321 | B1* | 7/2002 | Sakagawa et al. | ........ 370/238.1 |
| 2002/0154646 | A1* | 10/2002 | Dubois et al. | .............. 370/406 |
| 2003/0117494 | A1* | 6/2003 | Poblete | ....................... 348/148 |
| 2005/0207414 | A1* | 9/2005 | Duvvury | ...................... 370/389 |
| 2006/0031488 | A1* | 2/2006 | Swales | ........................ 709/224 |

\* cited by examiner

*Primary Examiner*—Duc Ho
(74) *Attorney, Agent, or Firm*—Bacon & Thomas, PLLC

(57) ABSTRACT

An equipment monitoring system line swap fast recovery method by installing a link detection mechanism in an Ethernet switch of an equipment monitoring system in an Ethernet between equipments at respective terminals of the Ethernet and a monitor equipment for enabling the monitor equipment to monitor working status of the equipments, such that when one equipment changed from a first port of the Ethernet switch to a second port thereof, the link detection mechanism detects the change of the connection, clears all address entry for the first port, and learns all address entry for the second port, for enabling the equipment monitoring system to keep functioning during the change of the connection.

20 Claims, 3 Drawing Sheets

EQUIPMENT MONITORING SYSTEM LINE SWAP FAST RECOVERY METHOD

BACKGROUND OF THE INVENTION

1. Field of the Invention

The present invention relates to an equipment monitoring system and, more particularly, to an equipment monitoring system line swap fast recovery method, which allows the equipment monitoring system to keep working when changing one equipment under monitoring from one port to another.

2. Description of the Related Art

Conventionally, when monitoring working status of an equipment (for example, a computer or power generator), the maintenance engineer must go to the site of every equipment and then check the equipment, or install an Ethernet and a server in the Ethernet to inquire working status of every equipment regularly through the application of a program in the server. When an Ethernet is used to link a server to the equipments to be monitored, the maintenance work is complicated. When changing the connection of one equipment from one port of the Ethernet switch (or Ethernet router) to another port, the Ethernet switch must be maintained off for a length of time, and then the Ethernet switch (or Ethernet router) must clear all the original address entry from the memory and then learn the address entry for the new port. Because the Ethernet switch (or Ethernet router) is off during connection change, the whole equipment monitoring system is stopped during this time period.

SUMMARY OF THE INVENTION

The present invention has been accomplished under the circumstances in view. It is therefore the main object of the present invention to provide an equipment monitoring system line swap fast recovery method, which allows the equipment monitoring system to keep working when changing one equipment under monitoring from one port to another of the Ethernet switch of the equipment monitoring system. To achieve this and other objects of the present invention, the equipment monitoring system line swap fast recovery method is to install a link detection mechanism in an Ethernet switch of an equipment monitoring system in an Ethernet between equipments at respective terminals of the Ethernet and a monitor equipment for enabling the monitor equipment to monitor working status of the equipments, such that when one equipment changed from a first port of the Ethernet switch to a second port thereof, the link detection mechanism detects the change of the connection, clears all address entry for the first port, and learns all address entry for the second port, for enabling the equipment monitoring system to keep functioning during the change of the connection.

DETAILED DESCRIPTION OF THE PREFERRED EMBODIMENT

Figure 1:
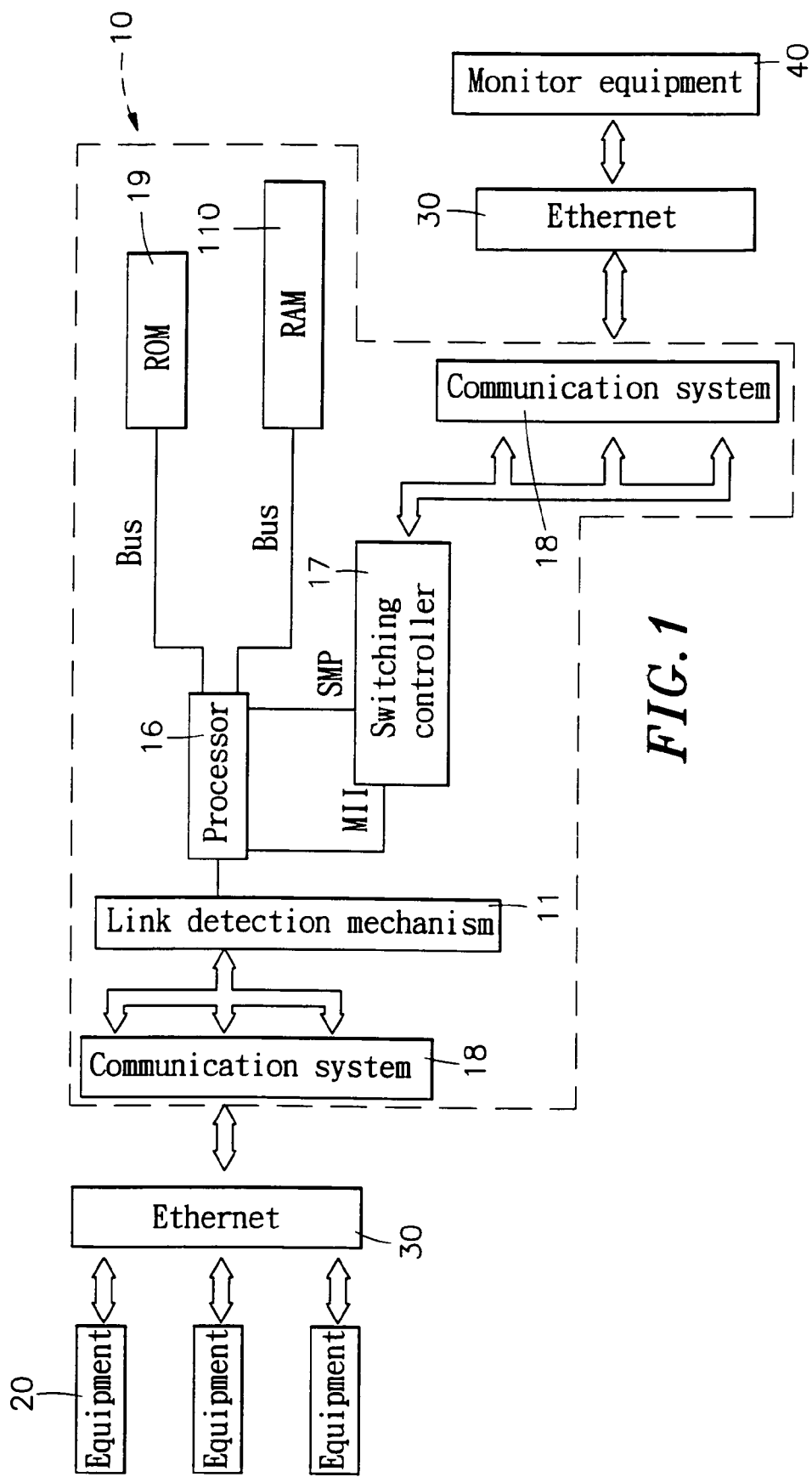
FIG. 1 is a system block diagram of the present invention (I).
Figure 2:
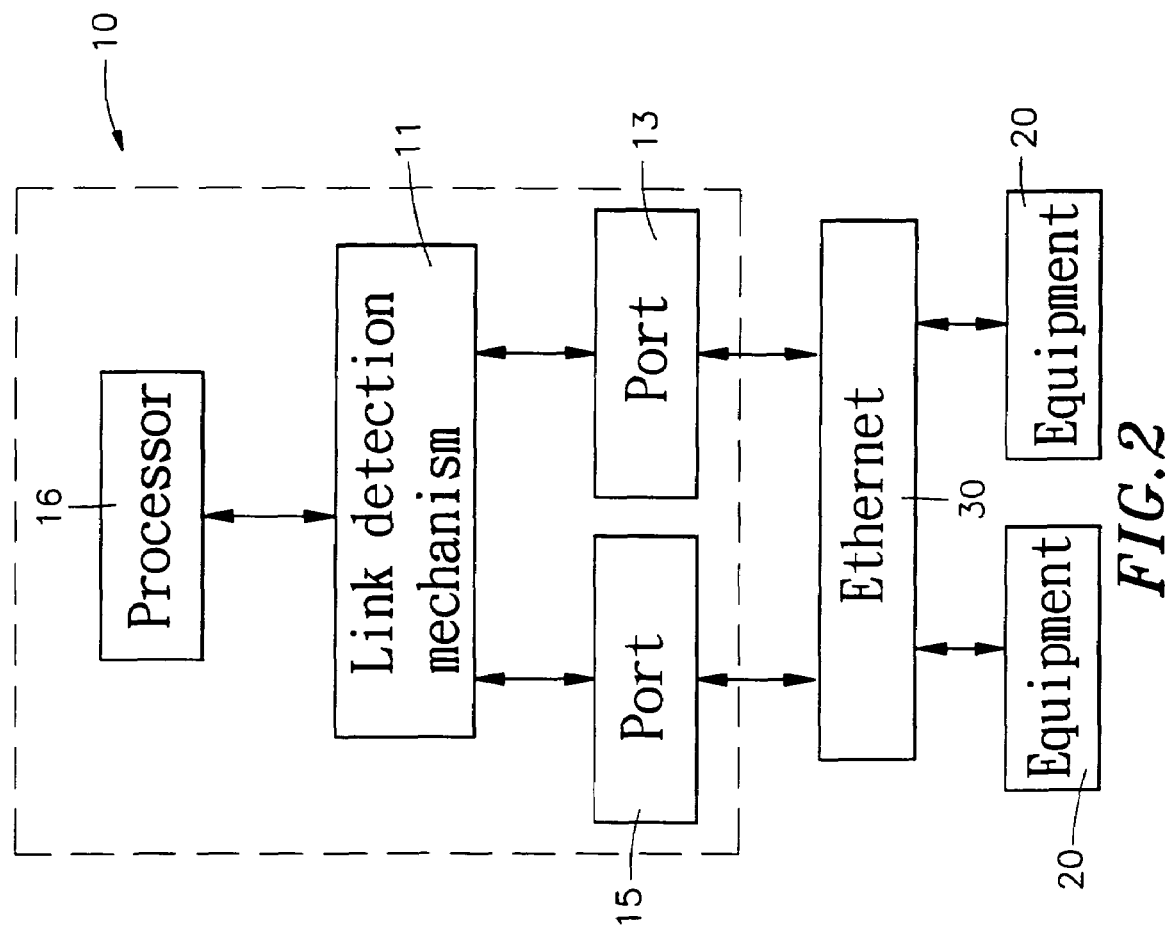
FIG. 2 is a system block diagram of the present invention (II).

Referring to FIGS. 1 and 2, an equipment monitoring system is shown comprising an Ethernet 30 connected to the equipments (computers, power generators, etc.) 20 to be monitored, a monitor equipment (for example, a computer) 10 linked to the Ethernet 30 and adapted to monitor working status of the equipments 20, and an Ethernet switch 10 installed in the Ethernet 30 and connected between the equipments 20 and the monitor equipment 40 for transmitting packets data from the equipments 20 to the monitor equipment 40. The Ethernet switch 10 comprises a link detection mechanism 11 adapted to detect linkage of the equipments 20, a processor (CPU) 16 adapted to control the operation of the link detection mechanism 11, a switching controller 17, and communication systems 18 connected between the Ethernet 30 and the equipments 20/monitor equipment 40 for enabling the Ethernet switch 10 to transmit data from the equipments 20 to the monitor equipment 40 through the Ethernet Referring to FIG. 1 again, the Ethernet switch 10 further comprises a read only memory (for example, flash memory) 19 and a random access memory (for example, SDRAM) 110 respectively connected to the processor 16 through a respective bus. The processor 16 stores processing data in the random access memory 19 temporarily to facilitate time-sharing multiplex data processing, and processed storage data in the read only memory 110.

The communication systems 18 of the Ethernet switch 10 can be fiber optic converters or twisted-pair cable connectors (RJ45).

Figure 3:
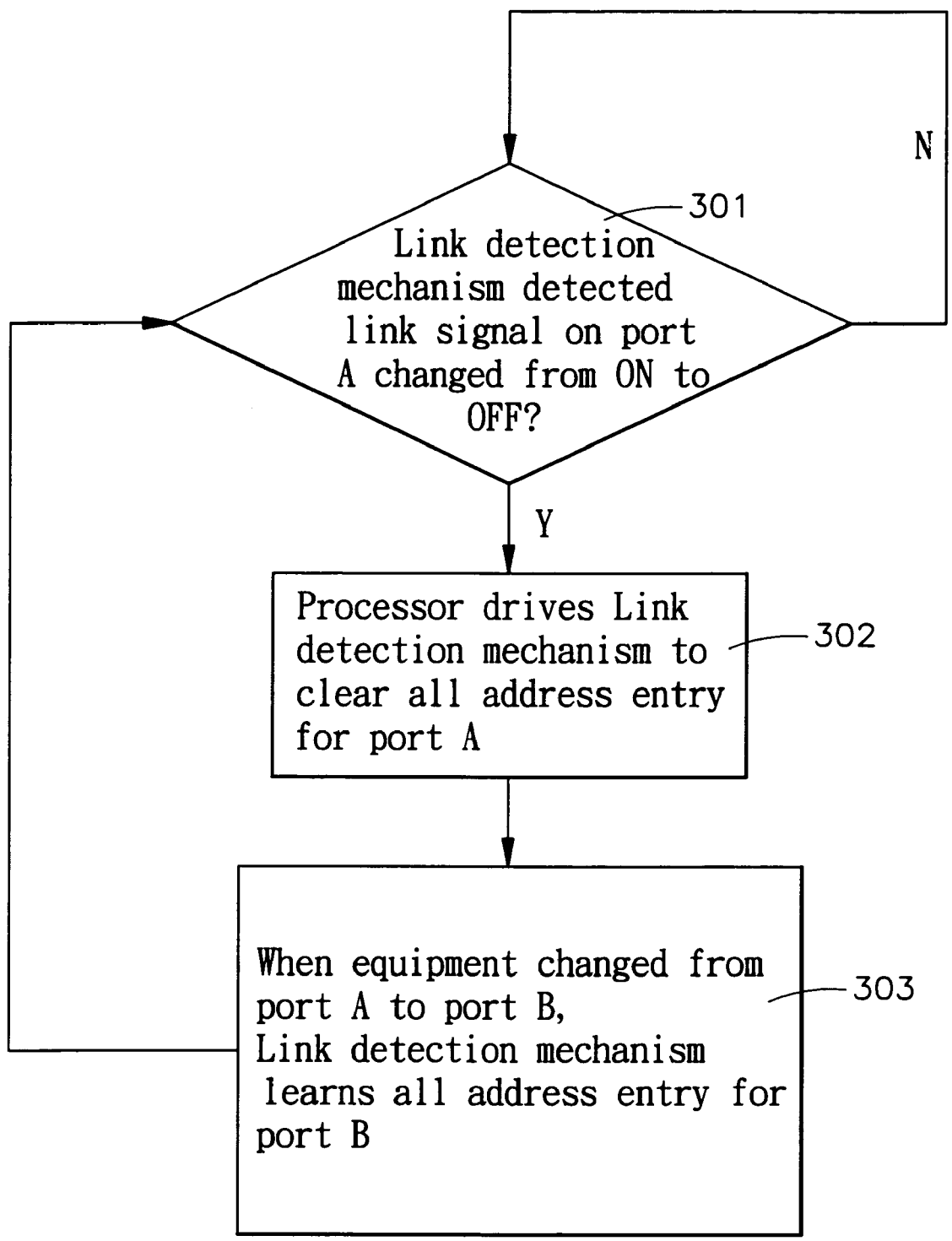
FIG. 3 is an operational flow chart of the present invention.

Referring to FIG. 3, when changing the connection of one equipment 20 from one port 13 to the other port 15 of the Ethernet switch 10, it proceeds subject to the following steps:

(301) At first, the link detection mechanism 11 detects if the assigned equipment 20 has been shifted from one port 13 to another port 15 or not (i.e., the link signal on port 13 has been changed from High (1) to Low (0) or not), and then it proceeds to next step (302) if positive, or returns to step (301) if negative;

(302) The processor 16 controls the link detection mechanism 11 to clear all address entry for port 13;

(303) When the assigned equipment 20 has been changed from port 13 to port 15 (the link signal on port 15 has been changed from Low (0) to High (1), the link detection mechanism 11 rapidly learn all address entry for port 15, enabling the Ethernet switch 10 to keep working.

By means of the application of the present invention, one management person can monitor working status of multiple equipments, and the equipment monitoring system keeps functioning when changing the connection of one equipment under monitoring from one port of the link detection mechanism to another.

A prototype of equipment monitoring system line swap fast recovery method, has been constructed with the features of the annexed drawings of FIGS. 1~3. The equipment monitoring system line swap fast recovery method functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. An equipment monitoring system line swap fast recovery method by using a link detection mechanism in an Ethernet switch of an equipment monitoring system, said Ethernet switch being connected between at least one equipment at terminals of an Ethernet and a monitor equipment for enabling said monitor equipment to monitor a working status of said at least one equipment, comprising the steps of,
   when one of said at least one equipment changes from a first port of said Ethernet switch to a second port thereof and said link detection mechanism detecting the change of the connection:
   clearing all address entries for said first port; and
   learning all address entries for said second port, thereby enabling said equipment monitoring system to keep functioning during the change of the connection.

2. The equipment monitoring system line swap fast recovery method as claimed in claim 1, wherein said at least one equipment is a computer.

3. The equipment monitoring system line swap fast recovery method as claimed in claim 1, wherein said at least one equipment is a power generator.

4. The equipment monitoring system line swap fast recovery method as claimed in claim 3, wherein said Ethernet switch comprises a processor adapted to control the operation of the said link detection mechanism.

5. The equipment monitoring system line swap fast recovery method as claimed in claim 4, wherein said Ethernet switch further comprises a switching controller, and at least one communication system connected to said Ethernet and said at least one equipment, and to said monitor equipment by said switching controller, to let said Ethernet switch monitor working status data of said at least one equipment and transmit said working status data from said at least one equipment to said monitor equipment through said Ethernet.

6. The equipment monitoring system line swap fast recovery method as claimed in claim 5, wherein said Ethernet switch further comprises a read only memory and a random access memory respectively connected to said processor, for enabling said processor to store processing data in said random access memory temporarily, and processed storage data in said read only memory.

7. The equipment monitoring system line swap fast recovery method as claimed in claim 6, wherein said read only memory is a flash memory.

8. The equipment monitoring system line swap fast recovery method as claimed in claim 6, wherein said random access memory is a SDRAM.

9. The equipment monitoring system line swap fast recovery method as claimed in claim 5, wherein said at least one communication system of said Ethernet switch is a twisted-pair cable connector (RJ45).

10. The equipment monitoring system line swap fast recovery method as claimed in claim 1, wherein said Ethernet switch is an Ethernet router.

11. An equipment monitoring system line swap fast recovery apparatus, comprising:
   a link detection mechanism in an Ethernet switch of an equipment monitoring system, said Ethernet switch being connected between at least one equipment at terminals of an Ethernet and a monitor equipment for enabling said monitor equipment to monitor a working status of said at least one equipment; and
   means for:
      when one of said at least one equipment changes from a first port of said Ethernet switch to a second port thereof, said link detection mechanism detecting the change of the connection;
      clearing all address entries for said first port; and
      learning all address entries for said second port, thereby enabling said equipment monitoring system to keep functioning during the change of the connection.

12. The equipment monitoring system line swap fast recovery apparatus as claimed in claim 11, wherein said at least one equipment is a computer.

13. The equipment monitoring system line swap fast recovery apparatus as claimed in claim 11, wherein said at least one equipment is a power generator.

14. The equipment monitoring system line swap fast recovery apparatus as claimed in claim 13, wherein said Ethernet switch comprises a processor adapted to control the operation of the said link detection mechanism.

15. The equipment monitoring system line swap fast recovery apparatus as claimed in claim 14, wherein said Ethernet switch further comprises a switching controller, and at least one communication system connected to said Ethernet and said at least one equipment, and to said monitor equipment by said switching controller, to let said Ethernet switch monitor working status data of said at least one equipment and transmit said working status data from said at least one equipment to said monitor equipment through said Ethernet.

16. The equipment monitoring system line swap fast recovery apparatus as claimed in claim 15, wherein said Ethernet switch further comprises a read only memory and a random access memory respectively connected to said processor, for enabling said processor to store processing data in said random access memory temporarily, and processed storage data in said read only memory.

17. The equipment monitoring system line swap fast recovery apparatus as claimed in claim 16, wherein said read only memory is a flash memory.

18. The equipment monitoring system line swap fast recovery apparatus as claimed in claim 16, wherein said random access memory is a SDRAM.

19. The equipment monitoring system line swap fast recovery apparatus as claimed in claim 15, wherein said at least one communication system of said Ethernet switch is a twisted-pair cable connector (RJ45).

20. The equipment monitoring system line swap fast recovery apparatus as claimed in claim 11, wherein said Ethernet switch is an Ethernet router.

* * * * *